(12) United States Patent
Wang

(10) Patent No.: US 11,794,292 B2
(45) Date of Patent: Oct. 24, 2023

(54) ASSEMBLING DIE BLOCK AND ASSEMBLING APPARATUS USING THE SAME

(71) Applicant: Ting-Jui Wang, New Taipei (TW)

(72) Inventor: Ting-Jui Wang, New Taipei (TW)

(*) Notice: Subject to any disclaimer, the term of this patent is extended or adjusted under 35 U.S.C. 154(b) by 0 days.

(21) Appl. No.: 17/476,490

(22) Filed: Sep. 16, 2021

(65) Prior Publication Data

US 2022/0126407 A1 Apr. 28, 2022

(30) Foreign Application Priority Data

Oct. 23, 2020 (TW) .................................. 109136977
Mar. 29, 2021 (TW) .................................. 110111339

(51) Int. Cl.
*B23P 19/02* (2006.01)
(52) U.S. Cl.
CPC .................................... *B23P 19/02* (2013.01)
(58) Field of Classification Search
CPC ......... B23P 19/02; B23P 19/027; B23P 19/00; B23P 19/064; G05B 2219/45204; G05B 19/41805
See application file for complete search history.

(56) References Cited

FOREIGN PATENT DOCUMENTS

| CN | 210413380 U | * | 4/2020 |
|---|---|---|---|
| CN | 210413380 U | | 4/2020 |

OTHER PUBLICATIONS

Huang, Lin; A Front Grille Of Vehicle Semi-automatic Assembling Machine; Apr. 28, 2020; English Machine Translation; pp. 1-4 (Year: 2023).*

* cited by examiner

*Primary Examiner* — Bayan Salone

(57) ABSTRACT

An assembling die block includes a first main die having at least one first mounting section; a second main die having at least one second mounting section; at least one first matching die respectively having a first mating section to be correspondingly associated with the at least one first mounting section; and at least one second matching die respectively having a second mating section to be correspondingly associated with the at least one second mounting section. Wherein, there is a plurality of first mounting sections arrayed in a matrix; or there is a plurality of second mounting sections arrayed in a matrix; or there is a plurality of first mounting sections arrayed in a matrix and a plurality of second mounting sections arrayed in a matrix. An assembling apparatus using the above assembling die block is also disclosed.

5 Claims, 11 Drawing Sheets

ASSEMBLING DIE BLOCK AND ASSEMBLING APPARATUS USING THE SAME

CROSS-REFERENCE TO RELATED APPLICATION

This non-provisional application claims priority under 35 U.S.C. § 119(a) on Patent Application No(s). 109136977 filed in Taiwan, R.O.C. on Oct. 23, 2020 and Patent Application No(s). 110111339 filed in Taiwan, R.O.C. on Mar. 29, 2021, the entire contents of which are hereby incorporated by reference.

BACKGROUND OF THE INVENTION

1. Field of the Invention

The present disclosure relates to an assembling die block and an assembling apparatus using the same, and more particularly, to an assembling die block and an assembling apparatus that enable quick and correct assembling of elements to a target member to form a desired object.

2. Description of the Related Art

Generally, an assembling die block for forming a desired object involves a plurality of assembling apparatus and manufacturing procedures, depending on the elements to be assembled to the object. As a result, the existing assembling die block is usually bulk in volume and can not be changed easily, which causes a lot of inconveniences in handling thereof and adversely affects the assembling efficiency.

BRIEF SUMMARY OF THE INVENTION

An objective of the present disclosure is to provide an assembling die block and an assembling apparatus using the assembling die block, so that elements and a target member can be quickly and correctly assembled to one another via the assembling die block and the assembling apparatus to form a desired object.

In an aspect of the present disclosure, there is provided a method of forming an assembling die block. In an embodiment of the assembling die block forming method according to the present disclosure, the following steps are included: obtaining at least one piece of process information; and forming at least one assembling die block by associating at least one matching die with at least one main die according to the process information. Wherein each piece of the process information includes a piece of main code information assigned to each of the at least one main die, and a piece of matching code information assigned to each of the at least one matching die; and each of the at least one piece of process information is used to indicate a relative position at where one matching die is to be correspondingly associated with one main die.

In another embodiment of the assembling die block forming method according to the present disclosure, the following steps are included: obtaining at least one piece of process information; forming at least one assembling die block by associating at least one matching die with at least one main die according to the process information; and forming an object by assembling elements to a target member using the at least one assembling die block. Wherein each piece of the process information includes a piece of main code information assigned to each of the at least one main die, and a piece of matching code information assigned to the each of the at least one matching die; and the at least one piece of the process information is used to indicate a relative position at where one matching die is to be correspondingly associated with one main die.

In another aspect of the present disclosure, there is provided an object manufacturing system, which includes an electronic device. The electronic device includes a database storing at least one piece of main code information assigned to at least one main die, at least one piece of matching code information assigned to at least one matching die and at least one piece of process information; a memory module including a process generation module; and a processor electrically connected to the database and the memory module for running the process generation module to provide the at least one piece of process information. Wherein each piece of the process information includes a piece of main code information assigned to each of the at least one main die, and a piece of matching code information assigned to each of the at least one matching die; and the at least one piece of the process information is used to indicate a relative position at where one matching die is to be correspondingly associated with one main die.

In an aspect of the present disclosure, there is provided an assembling die block. In an embodiment, the assembling die block includes a first main die having at least one first mounting section; a second main die having at least one second mounting section; at least one first matching die respectively including a first mating section to be associated with a corresponding one of the at least first mounting section; and at least one second matching die respectively including a second mating section to be associated with a corresponding one of the at least one second mounting sections. Wherein, there is a plurality of first mounting sections arrayed in a matrix on the first main die; or there is a plurality of second mounting sections arrayed in a matrix on the second main die; or there are a plurality of first mounting sections arrayed in a matrix on the first main die and a plurality of the second mounting sections arrayed in a matrix on the second main die.

In another aspect of the present disclosure, there is provided an assembling apparatus. In an embodiment, the assembling apparatus includes an operational base, a plurality of downward pressing sections supported on the operational base, and an assembling die block as described above. The first main die of the assembling die block is supported on the downward pressing sections, the second main die of the assembling die block is supported on the operational base, and the at least one first matching die and the at least one second matching die of the assembling die block are located opposite to one another.

In an embodiment of the assembling die block, there are included only a second main die including at least one second mounting section; and at least one second matching die respectively including a second mating section to be associated with a corresponding one of the at least one second mounting section. Wherein, there is a plurality of second mounting sections arrayed in a matrix on the second main die.

In an embodiment of the assembling apparatus, there are included an operational base; a plurality of downward pressing sections supported on the operational base; a pressure boosting section supported on the downward pressing sections and having at least one pressure boosting unit; and an assembling die block as described above. Wherein, the second main die of the assembling die block is supported on the operational base, and the at least one pressure boosting unit and the at least one second matching die of the assembling die block are located opposite to one another.

In an embodiment of the assembling die block, there are included a first main die having at least one mounting section; a second main die having at least one second mounting section; at least one first matching die respectively having a first mating section to be associated with a corresponding one of the at least one first mounting section; and at least one second matching die respectively having a second mating section to be associated with a corresponding one of the at least one second mounting section. Wherein, each of the at least one first mounting section is assigned a piece of main code information, each of the at least one first matching die is assigned a piece of matching code information, and the matching code information of the at least one first matching die and the main code information of the at least one first mounting section are in one-to-one correspondence; or each of the at least one second mounting section is assigned a piece of main code information, each of the at least one second matching die is assigned a piece of matching code information, and the matching code information of the at least one second matching die and the main code information of the at least one second mounting section are in one-to-one correspondence; or each of the at least one first mounting section is assigned a piece of main code information, each of the at least one second mounting section is assigned a piece of main code information, each of the at least one first matching die is assigned a piece of matching code information, and each of the at least one second matching die is assigned a piece of matching code information, the matching code information of the at least one first matching die and the main code information of the at least one first mounting section are in one-to-one correspondence, and the matching code information of the at least one second matching die and the main code information of the at least one second mounting section are in one-to-one correspondence.

In an embodiment of the assembling apparatus, there are included an operational base; a plurality of downward pressing sections supported on the operational base; and an assembling die block as described above. The first main die of the assembling die block is supported on the downward pressing sections, the second main die of the assembling die block is supported on the operational base, and the at least one first matching die and the at least one second matching die of the assembling die block are located opposite to one another.

In an embodiment of the assembling die block, there are included a second main die having at least one second mounting section; and at least one second matching die respectively having a second mating section to be associated with a corresponding one of the at least one second mounting section. Wherein, each of the at least one second mounting section is assigned a piece of main code information, each of the at least one second matching die is assigned a piece of matching code information, and the matching code information of the at least one second matching die and the main code information of the at least one second mounting section are in one-to-one correspondence.

In an embodiment of the assembling apparatus, there are included an operational base; a plurality of downward pressing sections supported on the operational base; a pressure boosting section having at least one pressure boosting unit and being supported on the downward pressing sections; and an assembling die block as described above. The second main die of the assembling die block is supported on the operational base, and the at least one pressure boosting unit and the at least one second matching die of the assembling die block are located opposite to one another.

In an embodiment of the assembling die block, there are included a first main die including at least one first mounting section; and at least one first matching die respectively including a first mating section to be associated with a corresponding one of the at least one first mounting section. Wherein, there is a plurality of first mounting sections arrayed in a matrix on the first main die.

In an embodiment of the assembling die block, there are includes a first main die including at least one first mounting section; and at least one first matching die respectively including a first mating section to be associated with a corresponding one of the at least one first mounting sections. Wherein, each of the at least one first mounting section is assigned a piece of main code information, each of the at least one first matching die is assigned a piece of matching code information, and the matching code information of the at least one first matching die and the main code information of the at least one first mounting section are in one-to-one correspondence.

In an embodiment of the assembling apparatus, there are included an operational base; a plurality of downward pressing sections supported on the operational base; a pressure boosting section having at least one pressure boosting unit and being supported on the downward pressing sections; and an assembling die block as described above. Wherein, the first main die of the assembling die block is supported on the downward pressing sections.

With the assembling die block and the assembling apparatus of the present disclosure, it is able to achieve the purpose of quick and correct assembling elements to a target member to form a desired object.

BRIEF DESCRIPTION OF THE DRAWINGS

The structure and the technical means adopted by the present disclosure to achieve the above and other objects can be best understood by referring to the following detailed description of the preferred embodiments and the accompanying drawings. It is understood the accompanying drawings only describe some embodiments of the present disclosure, and a person of ordinary skill in the art can make changes and modifications to the original drawings to obtain other useful drawings without doing creative work. Wherein.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Figure 1:
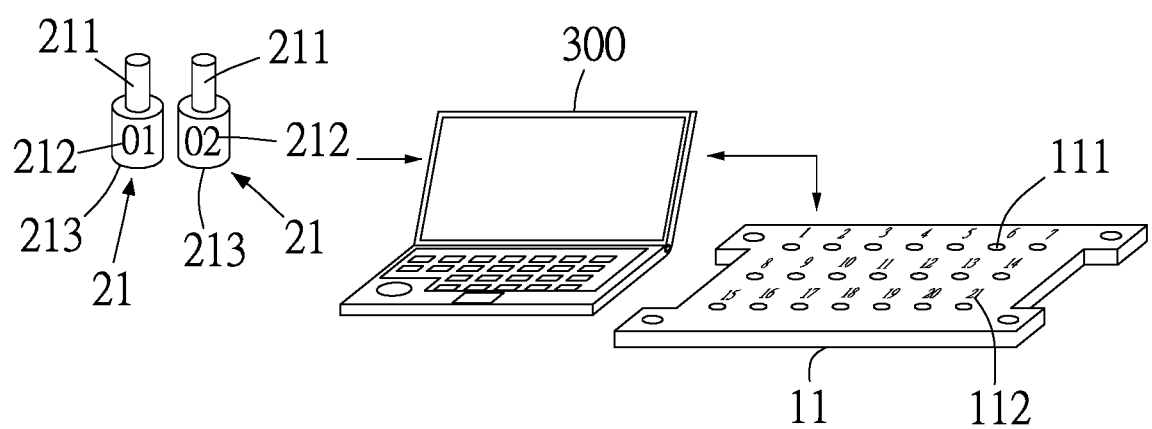
FIG. 1 is a conceptual view of an applied environment, in which an object manufacturing system according to the present disclosure operates.

Please refer to FIG. 1, which is a conceptual view of an applied environment, in which an object manufacturing system according to the present disclosure operates. The object manufacturing system includes an assembling die block 100 and an electronic device 300. The assembling die block 100 includes a first main die 11 and at least one first matching die 21. The assembling die block 100 uses the first main die 11 and the first matching dies 21 to assemble required elements to a target member to manufacture a desired object. The electronic device 300 is used to provide process information, which includes main code information 112 assigned to the first main die 11, such as a digit, a character or a symbol, and matching code information 212 assigned to each of the at least one first matching die 21, such as a digit, a character or a symbol, for indicating a relative position at where each of the at least one first matching die 21 is to be correspondingly associated with the first main die 11.

Since the relative position at where one first matching die 21 is to be correspondingly associated with the first main die 11 is clearly indicated by the process information, the at least one first matching die 21 and the first main die 11 can be quickly matched and associated with one another to minimize the situation of error combination and achieve the purpose of quick and correct combining of the two dies 11, 21 with one another.

The first main die 11 includes a plurality of first mounting sections 111. Each of the first mounting sections 111 has a location on the first main die 11 defined by one piece of main code information 112 assigned thereto, such as one of the numbers from 01 to 21 shown in FIG. 1. All the first mounting sections 111 on the same one first main die 11 respectively have a unique piece of main code information 112. Further, the first mounting sections 111 are arrayed in a matrix on the first main die 11. The first mounting sections 111 can be respectively a protruded structure, a recessed structure, a screw-fastening structure, a snap-fit structure or a magnetic attraction structure.

Each of the first matching dies 21 includes at least one first mating section 211 and one first assembling section 213, and each of the first mating sections 211 has a piece of matching code information 212 assigned thereto, such as the numbers 01 and 02 shown in FIG. 1. In the embodiment that the first matching die 21 includes a plurality of first mating sections 211, the first mating sections 211 on the same one first matching die 21 respectively have a unique piece of matching code information 212. Further, the first mating sections 211 can be respectively a protruded structure, a recessed structure, a screw-fastening structure, a snap-fit structure or a magnetic attraction structure; and the first assembling sections 213 can be respectively a flat structure, a protruded structure, a recessed structure, a rotational structure or a heating structure.

When associating the first mating sections 211 of the first matching dies 21 with the first mounting sections 111 of the first main die 11, since the relative position between each first mounting section 111 and a corresponding first mating section 211 is indicated by the main code information 112 and the matching code information 212 uniquely assigned to the first mounting section 111 and the corresponding first mating section 211, respectively, the first mating sections 211 of the first matching die 21 and the first mounting sections 111 of the first main die 11 can be quickly matched and combined with one another to minimize the situation of error combination and achieve quick and correct combining of the two dies 11, 21 with one another.

In an operable embodiment, the electronic device 300 can be embodied as a computer. For example, the electronic device 300 can be a notebook computer, a desktop computer, or a tablet computer without being particularly limited thereto.

In an operable embodiment, the main code information 112 can be implemented as digits or a graphic code. Similarly, the matching code information 212 can also be implemented as digits or a graphic code without being particularly limited thereto.

Figure 2:
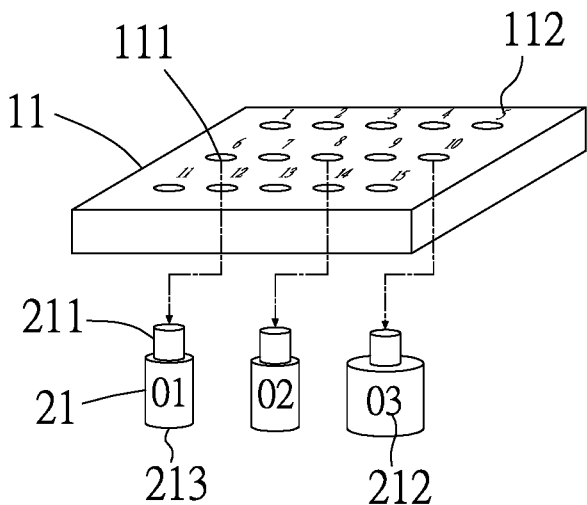
FIG. 2 is an exploded perspective view showing a first embodiment of an assembling die block according to the present disclosure, in which a plurality of first matching dies are associated with a first main die.

Please refer to FIG. 2 and Table 1. The relation between the first main die 11 and the first matching die 12 is now further explained. In a first embodiment of the assembling die block 100 provided according to the present disclosure, as shown in FIG. 2, the first main die 11 includes a plurality of first mounting sections 111, and each of the first mounting sections 111 is assigned a piece of main code information 112, such as one of the numbers 01 to 15 shown in FIG. 2. All the first mounting sections 111 respectively have a unique piece of main code information 112. In the first embodiment, each of the first matching dies 21 includes one first mating section 211. Every first mating section 211 is assigned a piece of matching code information 212, such as one of the numbers 01, 02 and 03 shown in FIG. 2. All the first mating sections 211 respectively have a unique piece of matching code information 212.

Please refer to Table 1 below, which shows a first example of the process information provided by the electronic device 300. However, it is understood the present disclosure is not particularly limited thereto.

TABLE 1

| Main code information | Matching code information |
|---|---|
| 06 | 01 |
| 08 | 02 |
| 10 | 03 |

The process information indicates the relative positions at where the first matching dies 21 are to be correspondingly associated with the first main die 11. Taking Table 1 as an example, the process information indicates the first mating section 211 having the matching code information 212 of "01" is to be correspondingly associated with the first mounting section 111 having the main code information 112 of "06"; the first mating section 211 having the matching code information 212 of "02" is to be correspondingly associated with the first mounting section 111 having the main code information 112 of "08"; the first mating section 211 having the matching code information 212 of "03" is to be correspondingly associated with the first mounting section 111 having the main code information 112 of "10". By following the combination relationship between the first main die 11 and the first matching dies 21 as indicated by the process information, it is able to quickly and correctly arrange or change the first matching dies 21 on the first main die 11 to achieve the purpose of quick and correct combination of the first matching dies 21 to the first main die 11.

Figure 3:
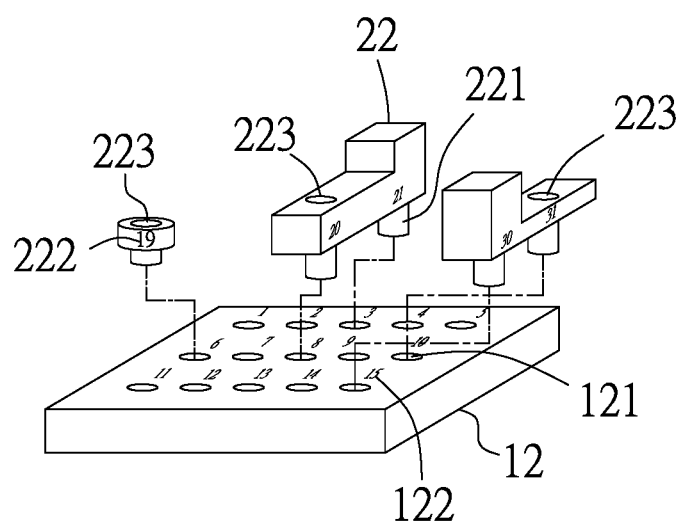
FIG. 3 is an exploded perspective view showing a second embodiment of the assembling die block according to the present disclosure, in which a plurality of second matching dies are associated with a second main die.

Please refer to FIG. 3 and Table 2 at the same time. FIG. 3 shows a second embodiment of the assembling die block 100 of the present disclosure, which includes a second main die 12 and at least one second matching die 22. In the second embodiment, the second main die 12 is the same as the first main die 11 and includes a plurality of second mounting sections 121, and each of the second mounting sections 121 is assigned a piece of main code information 122. All the second mounting sections 121 respectively have a unique piece of main code information 122. Further, the second mounting sections 121 are arrayed in a matrix on the second main die 12, and can be respectively a protruded structure, a recessed structure, a screw-fastening structure, a snap-fit structure or a magnetic attraction structure. In the second embodiment, each of the second matching dies 22 includes at least one second mating section 221 and one second assembling section 223. Each of the second mating sections 221 is assigned a piece of matching code information 222, such as one of the numbers "19", "20", "21", "30" and "31" shown in FIG. 3. In an embodiment that the second matching dies 22 respectively include a plurality of second mating sections 221, all the second mating sections 221 on the same one second matching die 22 respectively have a unique piece of matching code information 222. The second mating sections 221 can be respectively a protruded structure, a recessed structure, a screw-fastening structure, a snap-fit structure or a magnetic attraction structure; and the second assembling sections 223 can be respectively a flat structure, a protruded structure, a recessed structure, a rotational structure or a heating structure.

Please refer to Table 2, which shows another example of the process information provided by the electronic device 300. However, it is understood the present disclosure is not particularly limited thereto.

TABLE 2

| Main code information | Matching code information |
|---|---|
| 6 | 19 |
| 8 | 20 |
| 3 | 21 |
| 15 | 30 |
| 10 | 31 |

In the example of Table 2, the process information indicates the second mating section 221 having the matching code information 222 of "19" is to be correspondingly associated with the second mounting section 121 having the main code information 122 of "6"; the second mating section 221 having the matching code information 222 of "20" is to be correspondingly associated with the second mounting section 121 having the main code information 122 of "8"; the second mating section 221 having the matching code information 222 of "21" is to be correspondingly associated with the second mounting section 121 having the main code information 122 of "3"; the second mating section 221 having the matching code information 222 of "30" is to be correspondingly associated with the second mounting section 121 having the main code information 122 of "15"; and the second mating section 221 having the matching code information 222 of "31" is to be correspondingly associated with the second mounting section 121 having the main code information 122 of "10". In the second embodiment, each second matching die 22 can include a plurality of second mating sections 221. However, the present disclosure is not particularly limited thereto.

Figure 4:
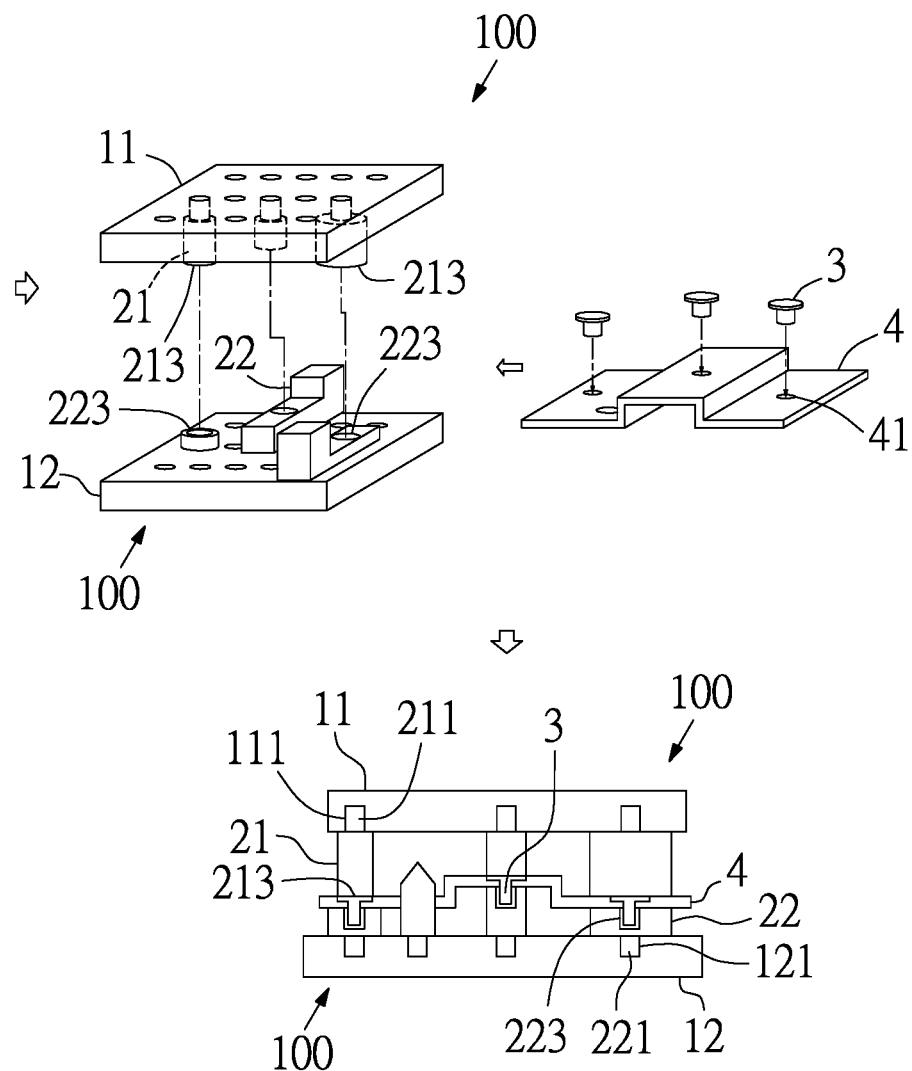
FIG. 4 illustrates the use of the assembling die block of the present disclosure according to a third embodiment thereof, in which a plurality of first and second matching dies are associated with a first and a second main die, respectively, to manufacture an object.

Please refer to FIG. 4, which shows the use of a third embodiment of the assembling die block 100 provided according to the present disclosure. In FIG. 4, the assembling die block 100 is a combination of the first main die 11 and the first matching dies 21 in the first embodiment of the assembling die block 100 as shown in FIG. 2 and the second main die 12 and the second matching dies 22 in the second embodiment of the assembling die block 100 as shown in FIG. 3.

The first main die 11 and the first matching dies 21 of FIG. 2 are combined with one another to form an upper die block, and the second main die 12 and the second matching dies 22 of FIG. 3 are combined with one another to form a lower die block. A plurality of elements 3 is positioned corresponding to the first assembling sections 213, such as a plurality of flat structures, of the first matching dies 21; and a target member 4, to which the elements 3 are to be assembled, is positioned with a plurality of connecting sections 41 thereof being located corresponding to the second assembling sections 223, such as a plurality of recessed structures, of the second matching dies 22; such that the elements 3 are located between the first matching dies 21 and the target member 4 to align with the connecting sections 41 and to be connected to the connecting sections 41. By approaching the upper die block and the lower die block toward each other for the first matching dies 21 to apply pressure to the elements 3, the elements 3 under the pressure are brought to connect to the connecting sections 41 of the target member 4 to form a desired object.

The present disclosure is not limited to the above embodiment. In another operable embodiment, the upper die block or the lower die block can be changed with other dies. For example, the elements and the target member 4 can be otherwise positioned between the first main die 11 and the lower die block, such that the element 3 are connected to the target member 4 when they are subjected to pressure.

Alternatively, the elements 3 can be otherwise positioned between the upper die block and the second main die 12, such that the elements 3 are connected to the target member 4 when they are subjected to pressure.

Figure 5:
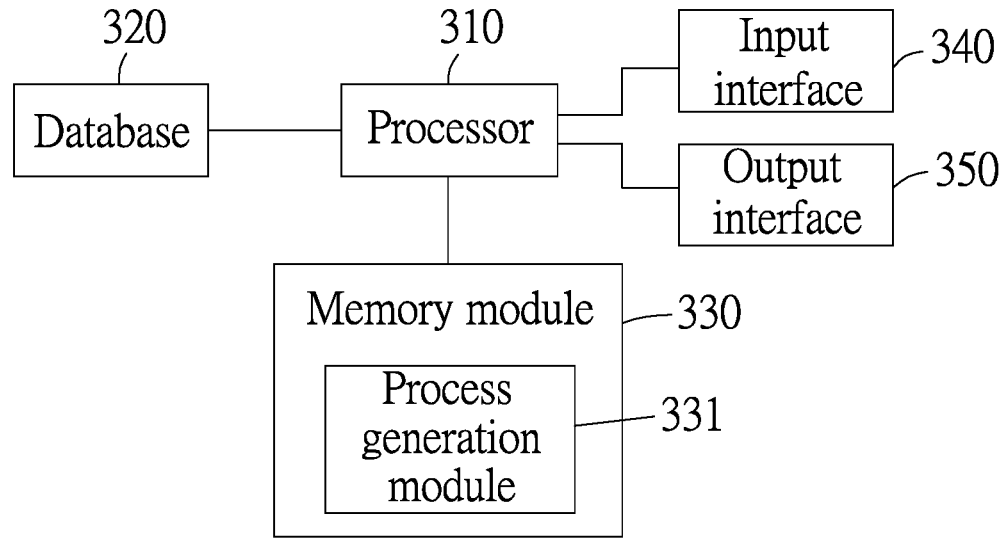
FIG. 5 is a system structural block diagram of a first embodiment of an electronic device according to the present disclosure.

Please refer to FIG. 5, in which a first embodiment of the electronic device 300 according to the present disclosure is shown. In the first embodiment thereof, the electronic device 300 includes at least a processor 310, a database 320, a memory module 330, an input interface 340 and an output interface 350. The processor 310 is electrically connected to the database 320, the memory module 330, the input interface 340 and the output interface 350.

The database 320 is used to store information needed by the electronic device 330 to operate. The information stored in the database 320 includes the main code information 112, 122 of at least one main die, including the first main die 11 and the second main die 12; the matching code information 212, 222 of at least one matching die, including the first matching die 21 and the second matching die 22; and at least one piece of process information.

The memory module 330 is used to store processes needed by the electronic device 300 to operate. The memory module 330 includes a process generation module 331 for generating the process information.

The input interface 340 is used to receive operating instructions input to the electronic device 300 by a user. The output interface 350 is used to provide the process information.

The processor 310 runs the process generation module 331 in order to access from the database 320 at least one piece of the main code information 112 of the first main die 11, at least one piece of the matching code information of the first matching die 21, and at least one piece of the process information. The at least one piece of main code information and the at least one piece of matching code information included in each piece of the process information are used to indicate the relative position at where the matching die 21 is to be associated with the first main die 11.

In this way, it is able to quickly and correctly arrange or change the first and second matching dies 21, 22 on the first and the second main die 11, 12 to achieve the purpose of quick and correct combination of the matching dies with the main dies.

In an embodiment, the processor 310 runs the process generation module 331 according to the input operating instruction, retrieves from the database 320 at least one piece of main code information 112 or 122 of the first or the second main die 11, 12 and at least one piece of matching code information 212 or 222 of the first or the second matching dies 21, 22, and selects corresponding main code information 112 or 122 and corresponding matching code information 212 or 222 according to the operating instruction to generate the process information.

In an embodiment, the processor 310 reads out the process information stored in the database 320 according to the operating instruction. In other words, the user can quickly select the process information stored in the database 320 and quickly perform the association of the first matching dies 21 with the first main die 11 or the association of the second matching dies 22 with the second main die 12 according to the selected process information.

Further, the processor 310 provides the process information via the output interface 350.

Figure 6:
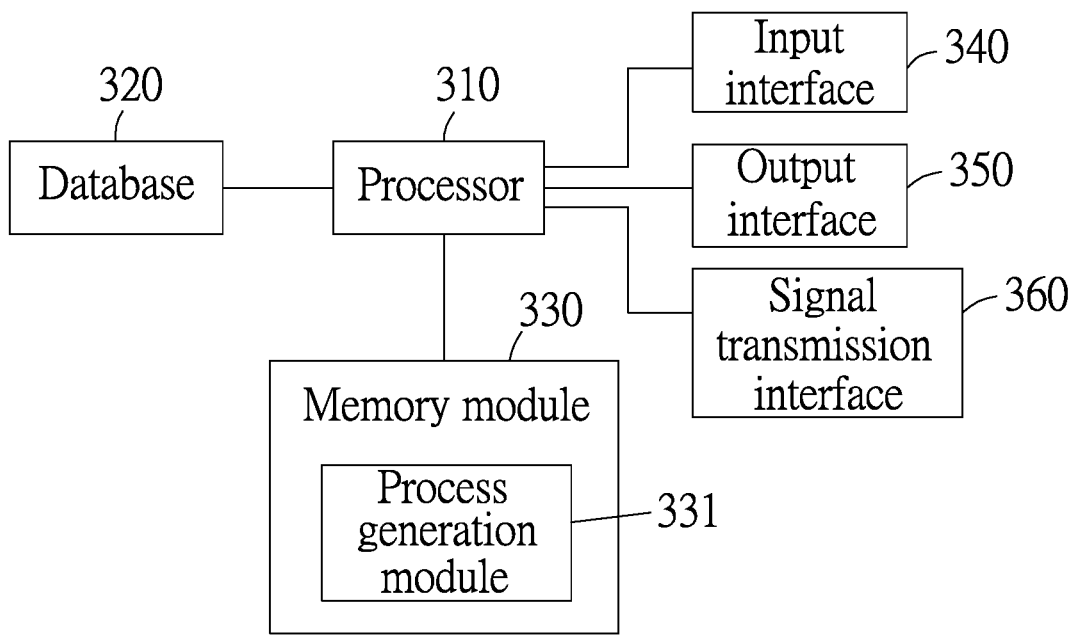
FIG. 6 is a system structural block diagram of a second embodiment of the electronic device according to the present disclosure.

The electronic device 300 further includes at least one signal transmission interface 360, as shown in FIG. 6. The processor 310 can transmit the process information to an automated device via the at least one signal transmission interface 360, so that the automated device associates the first matching dies 21 with the first main die 11 or associates the second matching dies 22 with the second main die 12 according to the process information.

With these arrangements, the electronic device 300 applicable to the assembling die block 100 of the present disclosure can provide the process information to enable quick arrangement or change of the matching dies 21, 22 on the main dies 11, 12, respectively, to achieve the purpose of quick and correct combination of the matching dies 21, 22 with the main dies 11, 12.

In an embodiment, the database 320 and the memory module 330 can be respectively embodied as a memory card, a hard disk drive and/or a memory. However, it is understood the present disclosure is not particularly limited thereto.

In an embodiment, the input interface 340 can be respectively embodied as a mouse, a keyboard, a microphone or a touchpad. However, it is understood the present disclosure is not particularly limited thereto.

In an embodiment, the output interface 350 can be respectively embodied as a display screen, a projection screen or a virtual reality (VR) vision device. However, it is understood the present disclosure is not particularly limited thereto.

In an embodiment, the at least one signal transmission interface 360 can be a wireless communication interface or a wired communication interface. However, it is understood the present disclosure is not particularly limited thereto.

Figure 7:
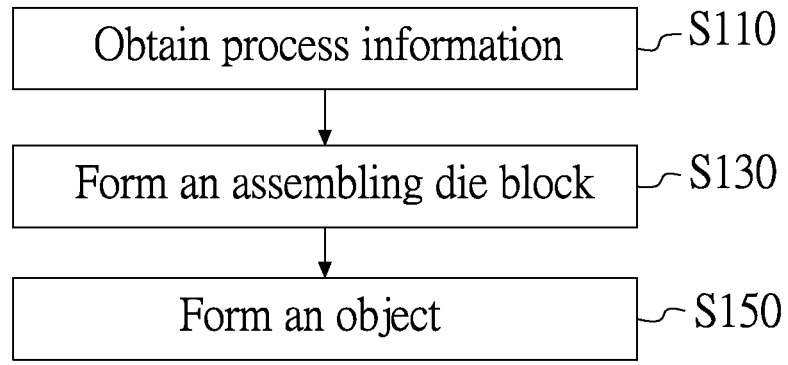
FIG. 7 is a flowchart showing some basic steps included in an object manufacturing method according to the present disclosure.

Please refer to FIG. 7. A method of combining the main dies and the matching dies of the assembling die block to manufacture an object is derived from the above preferred embodiments and the applied examples of the present disclosure. The method includes the following steps:

Step S110, in which a piece of process information is obtained. More specifically, the process information is retrieved from an electronic device 300.

Step S130, in which an assembling die block is formed. More specifically, in an embodiment, at least one matching die is associated with at least one main die according to the retrieved process information to form at least one assembling die block. The assembling die block has a configuration corresponding to a plurality of elements 3 or to a target member 4, with which an object is formed. Wherein, the at least one piece of process information includes at least one piece of main code information of the at least one main die and at least one piece of matching code information of the at least one matching die. Therefore, the process information can clearly indicate a relative position at where the at least one matching die is to be associated with the main die.

In an embodiment, the step S130 further includes the forming of an upper die block by associating at least one matching die 21 with a first main die 11 or the forming of a lower die block by associating at least one second matching die 22 with a second main die 12 according to the process information. In other words, one or more assembling die blocks can be formed according to the retrieved process information.

Step S150, in which an object is formed. The assembling die block formed in the above steps 110 and 130 provides a way of manufacturing an object. With the assembling die block, the elements 3 and the target member 4 under a force applied thereto can be assembled or connected to one another to complete the object.

In an embodiment, the step S150 further includes the step of positioning the elements 3 to the upper die block and the positioning the target member 4 to the lower die block, so that the element 3 and the target member 4 are located between the upper die block and the lower die block and can be connected to one another when a force is applied to them by the upper and the lower die block. In this embodiment, more than on assembling die block can be used to complete the manufacturing of the object. Further, it is also possible to position the elements 3 and the target member 4 between the first main die 11 and one lower die block. In this case, the elements 3 and the target member 4 can also be connected to one another when a force is applied thereto by the first main die 11 and the lower die block. Alternatively, the elements 3 and the target member 4 can be positioned between the upper die block and the second main die 12. In this case, the elements 3 and the target member 4 can also be connected to one another when a force is applied thereto by the upper die block and the second main die 12.

Figure 8:
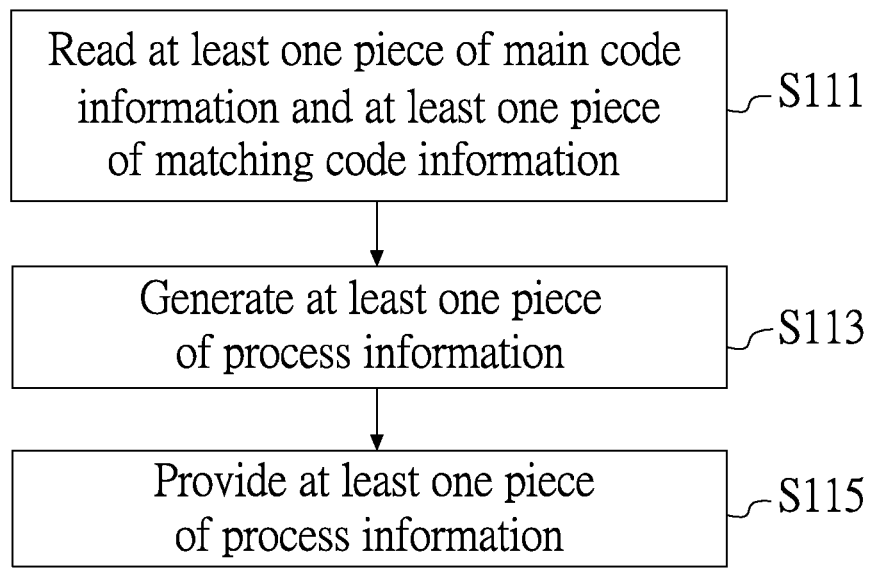
FIG. 8 is a flowchart showing some further steps included in the object manufacturing method according to the present disclosure.

The step S110 can further include the following steps, as shown in FIG. 8:

Step S111, in which at least one piece of main code information and at least one piece of matching code information are read. More specifically, in this embodiment, as shown in FIG. 5 or 6, a processor 310 of the electronic device 300 runs a process generation module 331 and reads a database 320 to retrieve at least one piece of main code information 112, 122, at least one piece of matching code information 212, 222, and/or to retrieve the process information that includes at least one piece of main code information and at least one piece of matching code information.

Step S113, in which at least one piece of process information is generated. In this embodiment, as shown in FIG. 5 or 6, the processor 310 runs the process generation module 331 and follows an operating instruction input by a user to select at least one of the main code information 112, 122 and at least one of the matching code information that are corresponding to one another, in order to generate the process information. In another operable embodiment, the processor 310 follows the operating instruction to read all the process information stored in the database 320, in order to generate the at least one piece of process information.

Step S115, in which the at least one piece of process information is provided. In this embodiment, as shown in FIG. 5 or 6, the processor 310 runs the process generation module 331 and provides the process information via an output interface 350 of the electronic device 300. In another embodiment, the processor 310 runs the process generation module 331 and provides the process information to an automated device via a signal transmission interface 360 of the electronic device 300.

Thus, in the object manufacturing method according to the present disclosure, the process information enables quick and correct arrangement or change of the first matching dies 21 or the second matching dies 22 on the first main die 11 or the second main die 12, respectively, to achieve the purpose of quick and correct forming of the assembling die block.

In summary, with the object manufacturing method, the method of combining main dies and matching dies to form the assembling die block, and the system for manufacturing an object according to the present disclosure, a plurality of matching dies can be quickly and correctly arranged or changed according to the process information, so that it is possible to effectively increase the speed and correctness of combining the matching dies 21, 22 with the main dies 11, 12. In addition, when forming the assembling die block in a modularized method, more than one manufacturing process can be realized through the array of a plurality of matching dies on one main die. This largely increases the convenience in changing and the flexibility of application of the assembling die block.

Please refer to FIGS. 2 to 4. The third embodiment of the assembling die block 100 provided according to the present disclosure as shown in FIG. 4 includes a first main die 11, a second main die 12, at least one first matching die 21, and at least one second matching die 22. The first main die 11 includes at least one first mounting section 111 and the second main die 12 includes at least one second mounting section 121. Each of the first matching dies 21 includes a first mating section 211 to be associated with one corresponding first mounting section 111; and each of the second matching dies 22 includes a second mating section 221 to be associated with one corresponding second mounting section 121. Wherein, there is a plurality of first mounting sections 111 arrayed in a matrix on the first main die 11 or there is a plurality of second mounting sections 121 arrayed in a matrix on the second main die 12; or alternatively, there is a plurality of first mounting sections 111 arrayed in a matrix on the first main die 11 and a plurality of second mounting sections 121 arrayed in a matrix on the second main die 12.

In an embodiment, there is a plurality of first mounting sections 111 arrayed in a matrix on the first main die 11, and each of the first mounting sections 111 is assigned a piece of main code information 112. On the other hand, there is one or a plurality of first matching dies 21, each of which is assigned a piece of matching code information 212. The matching code information 212 of the first matching dies 21 and the main code information 112 of the first mounting sections 111 are in one-to-one correspondence.

In an embodiment, there is a plurality of second mounting sections 121 arrayed in a matrix on the second main die 12, and each of the second mounting sections 121 is assigned a piece of main code information 122. On the other hand, there is one or a plurality of second matching dies 22, each of which is assigned a piece of matching code information 222. The matching code information 222 of the second matching dies 22 and the main code information 122 of the second mounting sections 121 are in one-to-one correspondence.

In an embodiment, there is a plurality of first mounting sections 111 arrayed in a matrix on the first main die 11 and respectively assigned a piece of main code information 112, and there is one or a plurality of first matching dies 21 respectively assigned a piece of matching code information 212, and the matching code information 212 of the first matching dies 21 and the main code information 112 of the first mounting sections 111 are in one-to-one correspondence; or alternatively, there is a plurality of second mounting sections 121 arrayed in a matrix on the second main die 12 and respectively assigned a piece of main code information 122, and there is one or a plurality of second matching dies 22 respectively assigned a piece of matching code information 222, and the matching code information 222 of the second matching dies 22 and the main code information 122 of the second mounting sections 121 are in one-to-one correspondence.

Please refer to FIG. 3. The second embodiment of the assembling die block 100 provided according to the present disclosure as shown in FIG. 3 includes a second main die 12 and at least one second matching die 22. The second main die 12 includes at least one second mounting section 121 and every second matching die 22 includes at least one second mating section 221 to be associated with one corresponding second mounting section 121. Wherein, there is a plurality of second mounting sections 121 arrayed in a matrix on the second main die 12.

In an embodiment, each of the second mounting sections 121 is assigned a piece of main code information 122, and there is a plurality of second matching dies 22 respectively assigned a piece of matching code information 222. The matching code information 222 of the second matching dies 22 and the main code information 122 of the second mounting sections 121 are in one-to-one correspondence.

Please refer to FIG. 2. The first embodiment of the assembling die block 100 provided according to the present disclosure as shown in FIG. 2 includes a first main die 11 and at least one first matching die 21. The first main die 11 includes at least one first mounting section 111, and every first matching die 21 includes at least one first mating section 211 to be associated with one corresponding first mounting section 111. Wherein, there is a plurality of first mounting sections 111 arrayed in a matrix on the first main die 11.

In an embodiment, the first mounting sections 111 are respectively assigned a piece of main code information 112, and there is one or a plurality of first matching dies 21 respectively assigned a piece of matching code information 212. The matching code information of the first matching dies 21 and the main code information of the first mounting sections 111 are in one-to-one correspondence.

Please refer to FIG. 2. The first embodiments of the assembling die block 100 provided according to the present disclosure as shown in FIG. 2 includes a first main die 11 and at least one first matching die 21. The first main die 11 includes at least one first mounting section 111, and every first matching die 21 includes at least one first mating section 211 to be associated with one corresponding first mounting section 111. Wherein, each of the first mounting sections 111 is assigned a piece of main code information, and there is one or a plurality of first matching dies 21 respectively assigned a piece of matching code information 212. The matching code information 212 of the first matching dies 21 and the main code information 112 of the first mounting sections 111 are in one-to-one correspondence.

In an embodiment, there is a plurality of first mounting sections 111 arrayed in a matrix on the first main die 11.

Please refer to FIGS. 2 to 4. The third embodiment of the assembling die block 100 provided according to the present disclosure as shown in FIG. 4 includes a first main die 11, a second main die 12, at least one first matching die 21, and at least one second matching die 22. The first main die 11 includes at least one first mounting section 111 and the second main die 12 includes at least one second mounting section 121. Each of the first matching dies 21 includes a first mating section 211 to be associated with one corresponding first mounting section 111; and each of the second matching dies 22 includes a second mating section 221 to be associated with one corresponding second mounting section 121. Wherein, the first mounting sections 111 are respectively assigned a piece of main code information 112, the first matching dies 21 are respectively assigned a piece of matching code information 212, and the matching code information 212 of the first matching dies 21 and the main code information 112 of the first mounting sections 111 are in one-to-one correspondence; or the second mounting sections 121 are respectively assigned a piece of main code information 122, the second matching dies 22 are respectively assigned a piece of matching code information 222, and the matching code information 222 of the second matching dies 22 and the main code information 122 of the second mounting sections 121 are in one-to-one correspondence; or the first mounting sections 111 are respectively assigned a piece of main code information 112, the second mounting sections 121 are respectively assigned a piece of main code information 122, the first matching dies 21 are respectively assigned a piece of matching code information 212, and the second matching dies 22 are respectively assigned a piece of matching code information 222, and the matching code information 212 of the first matching dies 21 and the main code information 112 of the first mounting sections 111 are in one-to-one correspondence, and the matching code information 222 of the second matching dies 22 and the main code information 122 of the second mounting sections 121 are in one-to-one correspondence.

In an embodiment, the first mounting sections 111 are respectively assigned a piece of main code information 112, the first matching dies 21 are respectively assigned a piece of matching code information 212, and the matching code information 212 of the first matching dies 21 and the main code information 112 of the first mounting sections 111 are in one-to-one correspondence. Wherein, there is a plurality of first mounting sections 111 arrayed in a matrix on the first main die 11, and there is one or a plurality of first matching dies 21.

In an embodiment, the second mounting sections 121 are respectively assigned a piece of main code information 122, the second matching dies 22 are respectively assigned a piece of matching code information 222, and the matching code information 222 of the second matching dies 22 and the main code information 122 of the second mounting sections 121 are in one-to-one correspondence. Wherein, there is a plurality of second mounting sections 121 arrayed in a matrix on the second main die 12, and there is one or a plurality of second matching dies 22.

In an embodiment, the first mounting sections 111 are respectively assigned a piece of main code information 112, the first matching dies 21 are respectively assigned a piece of matching code information 212, and the matching code information 212 of the first matching dies 21 and the main code information 112 of the first mounting sections 111 are in one-to-one correspondence. Wherein, there is a plurality of first mounting sections 111 arrayed in a matrix on the first main die 11, and there is one or a plurality of first matching dies 21; or alternatively, the second mounting sections 121 are respectively assigned a piece of main code information 122, the second matching dies 22 are respectively assigned a piece of matching code information 222, and the matching code information 222 of the second matching dies 22 and the main code information 122 of the second mounting sections 121 are in one-to-one correspondence. Wherein, there is a plurality of second mounting sections 121 arrayed in a matrix on the second main die 12, and there is one or a plurality of second matching dies 22.

Please refer to FIG. 3. The second embodiment of the assembling die block 100 provided according to the present disclosure includes a second main die 12 and a second matching die 22. The second main die 12 may include at least one second mounting sections 121, and the second matching die 22 includes at least one second mating section 221 to be associated with one corresponding second mounting sections 121. Wherein, the second mounting sections 121 are respectively assigned a piece of main code information 122, the second matching dies 22 are respectively assigned a piece of matching code information 222, and the matching code information 222 of the second matching dies 22 and the main code information of the second mounting sections 121 are in one-to-one correspondence.

In an embodiment, there is a plurality of second mounting sections 121 arrayed in a matrix on the second main die 12, and there is one or a plurality of second matching dies 22.

Figure 9:
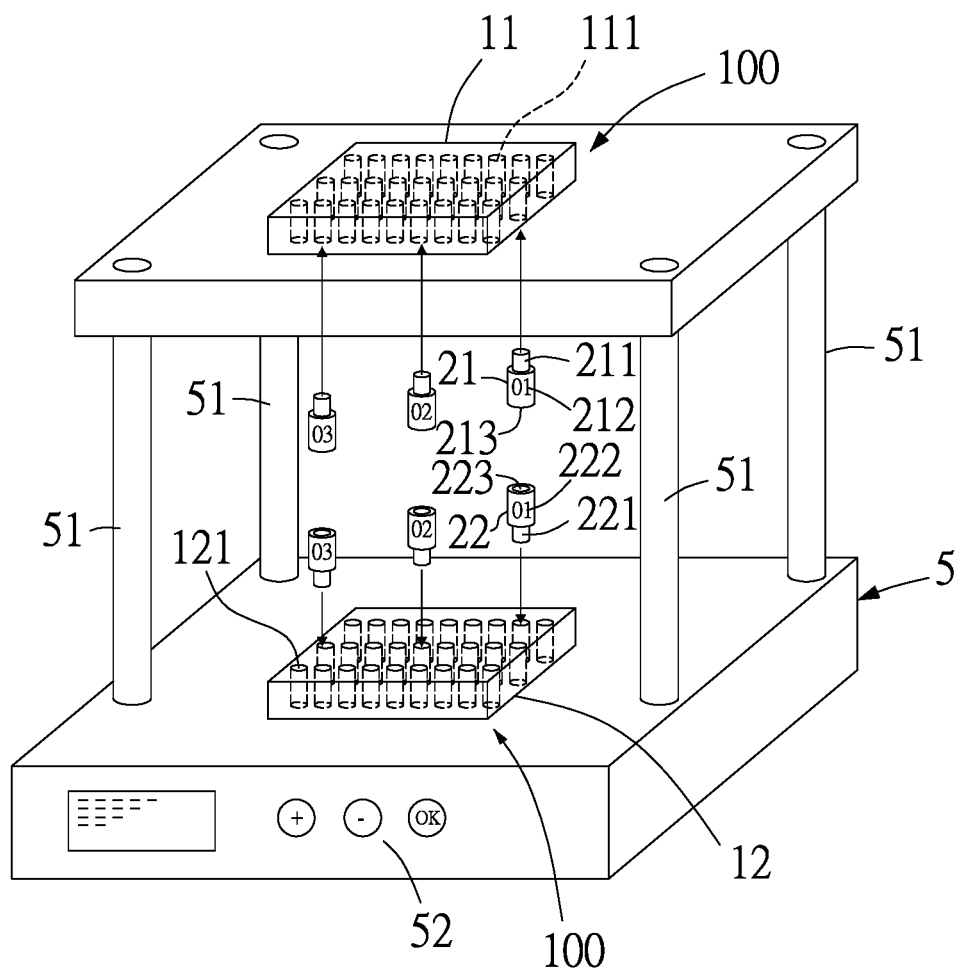
FIG. 9 is a simplified perspective view of a first embodiment of an assembling apparatus that uses the first and second main dies and the first and second matching dies according to the present disclosure to manufacture an object.
Figure 10:
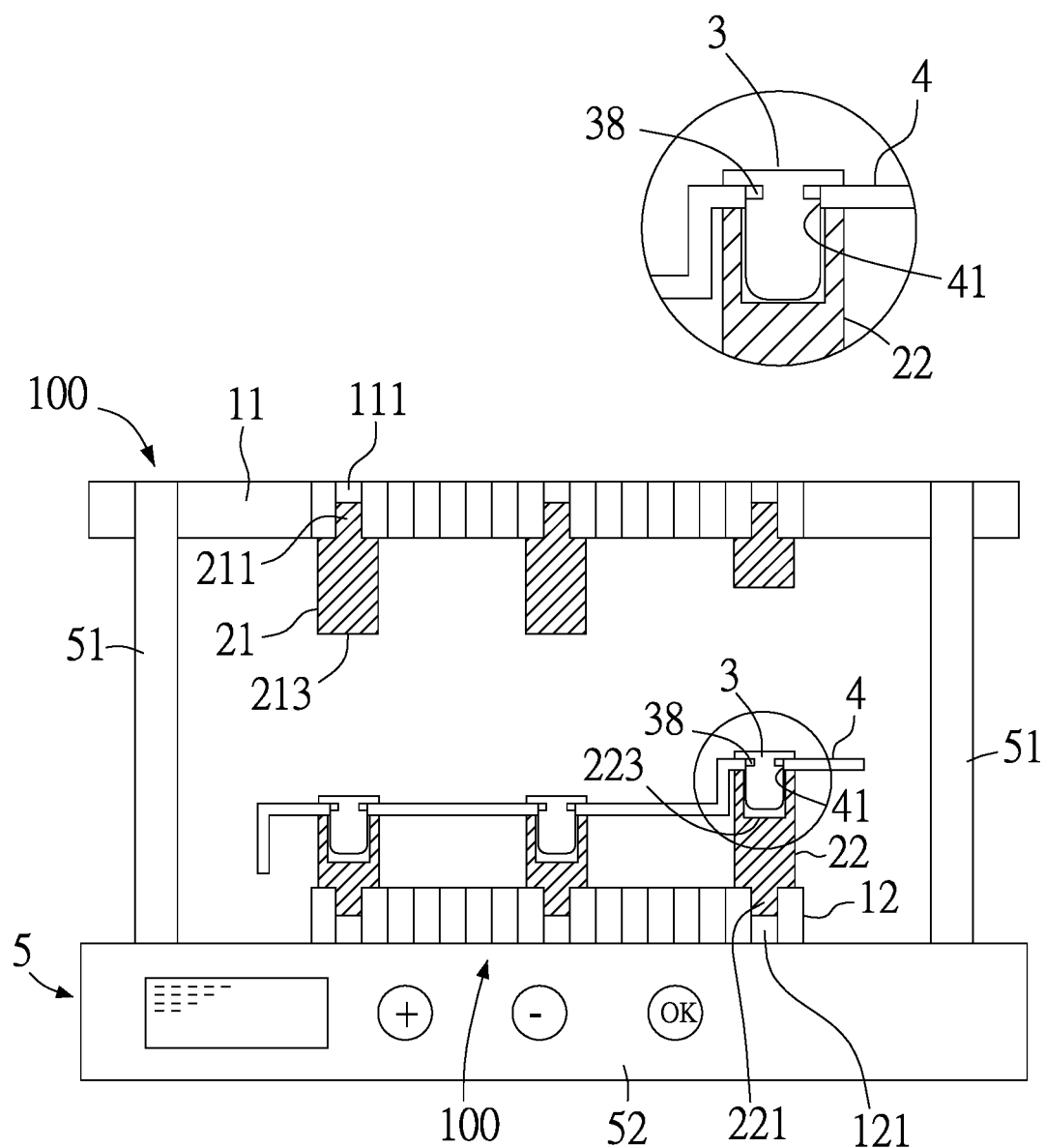
FIG. 10 shows the assembling apparatus of FIG. 9 before the associated first main and first matching dies are pressed against the associated second main and second matching dies to manufacture an object.
Figure 11:
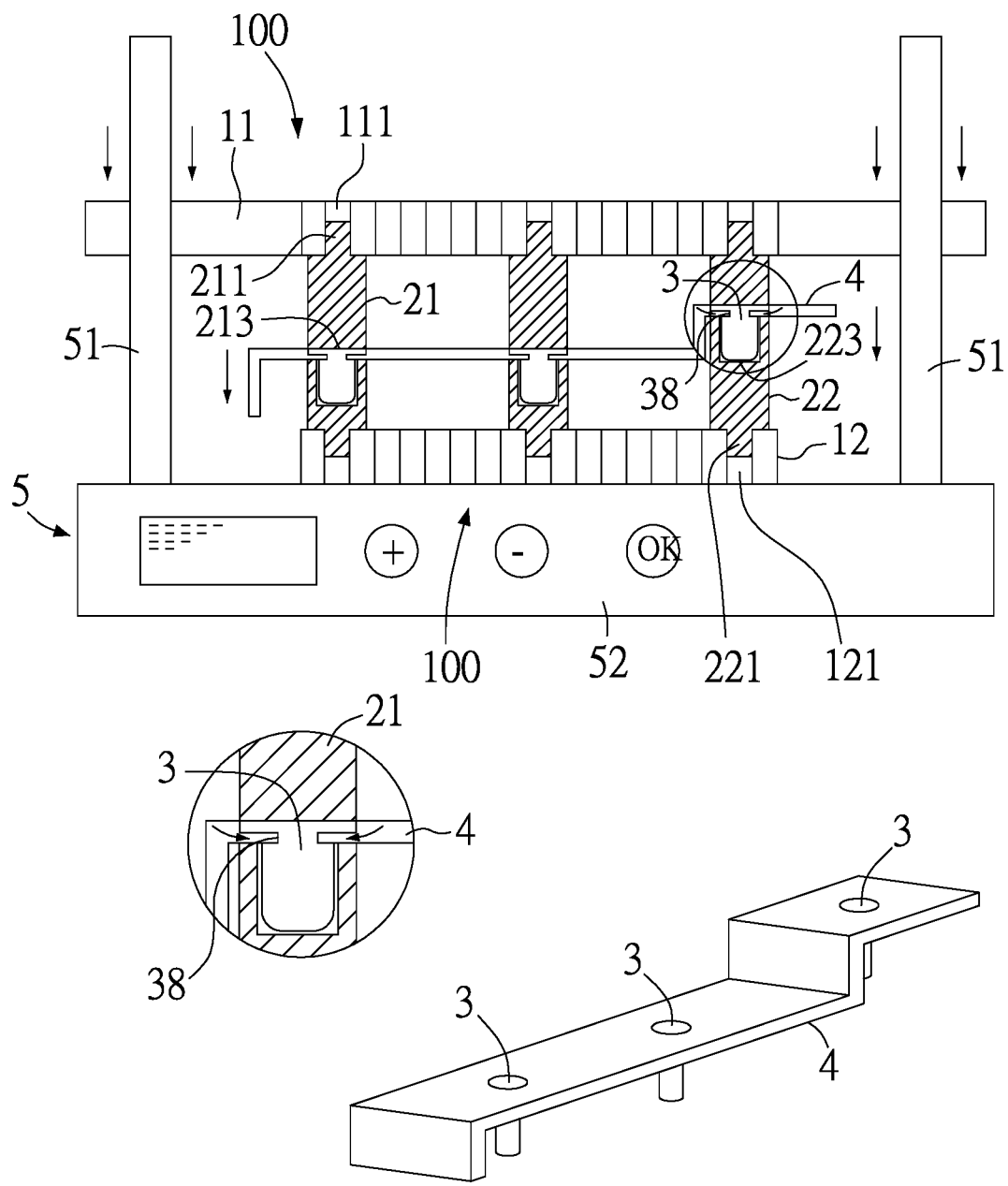
FIG. 11 shows the assembling apparatus of FIG. 9 after the associated first main and first matching dies are pressed against the associated second main and second matching dies to manufacture the object.
Figure 12:
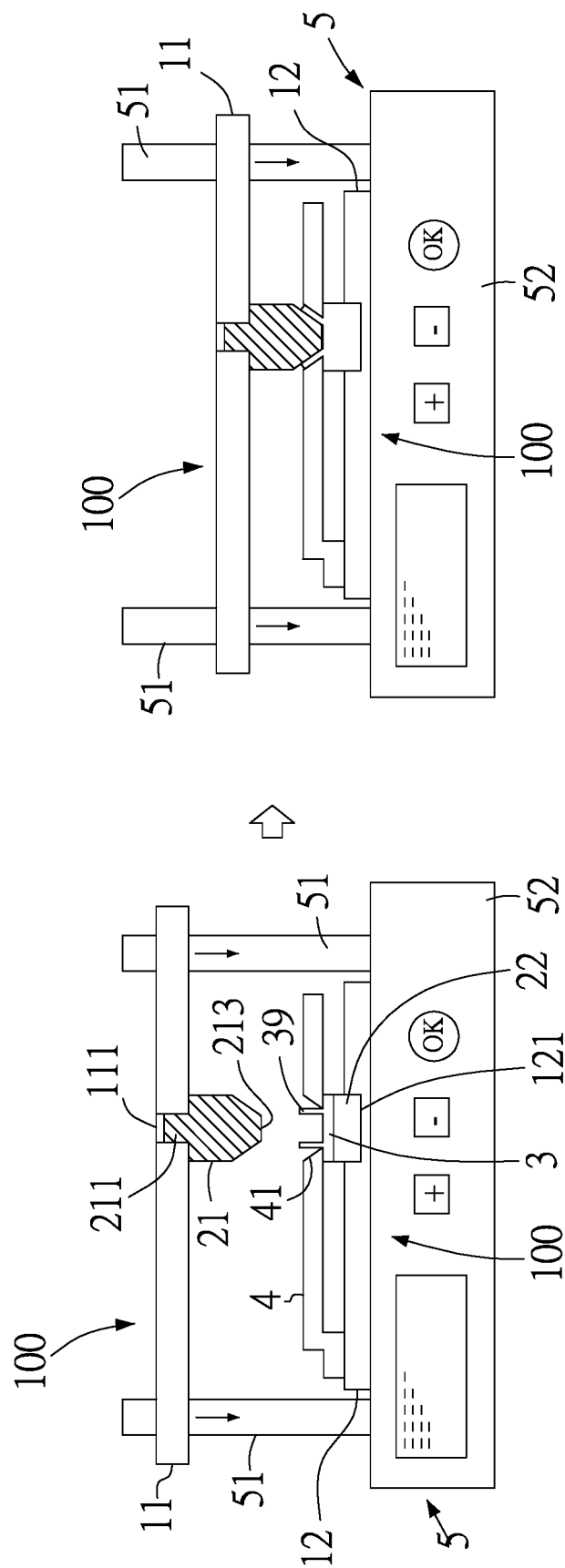
FIG. 12 is a simplified sectional side view of a second embodiment of the assembling apparatus that uses the first and second main dies and the first and second matching dies according to the present disclosure to manufacture an object.

Please refer to FIGS. 9 to 11, which show a first embodiment of an assembling apparatus 5 provided according to the present disclosure includes an operational base 52, a plurality of downward pressing sections 51 and the above-described assembling die block 100. The first main die 11 of the assembling die block 100 is supported on the downward pressing sections 51, the second main die 12 of the assembling die block 100 is supported on the operational base 52, and the first matching dies 21 and the second matching dies 22 of the assembling die block 100 are located opposite to one another. The downward pressing sections 51 can be respectively an air-pressure powered, a hydraulically powered, a magnetically powered, or a linear motor powered stem for driving the first main die 11 to move upwardly and downwardly. The operational base 52 has a central processing unit, a memory and a control circuit provided thereon for actuating and controlling the downward pressing sections 51 to move. At the operational base 52, the downward pressing sections 51 are controllable to move the first main die 11 downward, so that the first assembling sections 213 of the first matching dies 21 press the elements 3 against the connecting sections 41 (such as assembling holes) on the target member 4, causing rim areas of the connecting sections 41 to deform and enter or flow into a plurality of material receiving spaces 38 on the elements 3. Wherein, the target member 4 is supported on the second assembling sections 223 of the second matching dies 22. With these arrangements, the assembling apparatus 5 according to the present disclosure enables quick and correct assembling of the elements 3 to the target member 4 to form the desired object. Further, as shown in FIG. 12, in a second embodiment of the assembling apparatus 5, the downward pressing sections 51 can be controlled at the operational base 52 to move only the first main die 11 downward, so that the first assembling sections 213 of the first matching dies 21 apply pressure to expansion connecting sections 39 (such as annular flanges or upward extended legs) of the elements 3. As a result, the expansion connecting sections 39 are deformed and flared to clamp to peripheral areas of the assembling sections 41 (such as assembling holes) on the target member 4.

Figure 13:
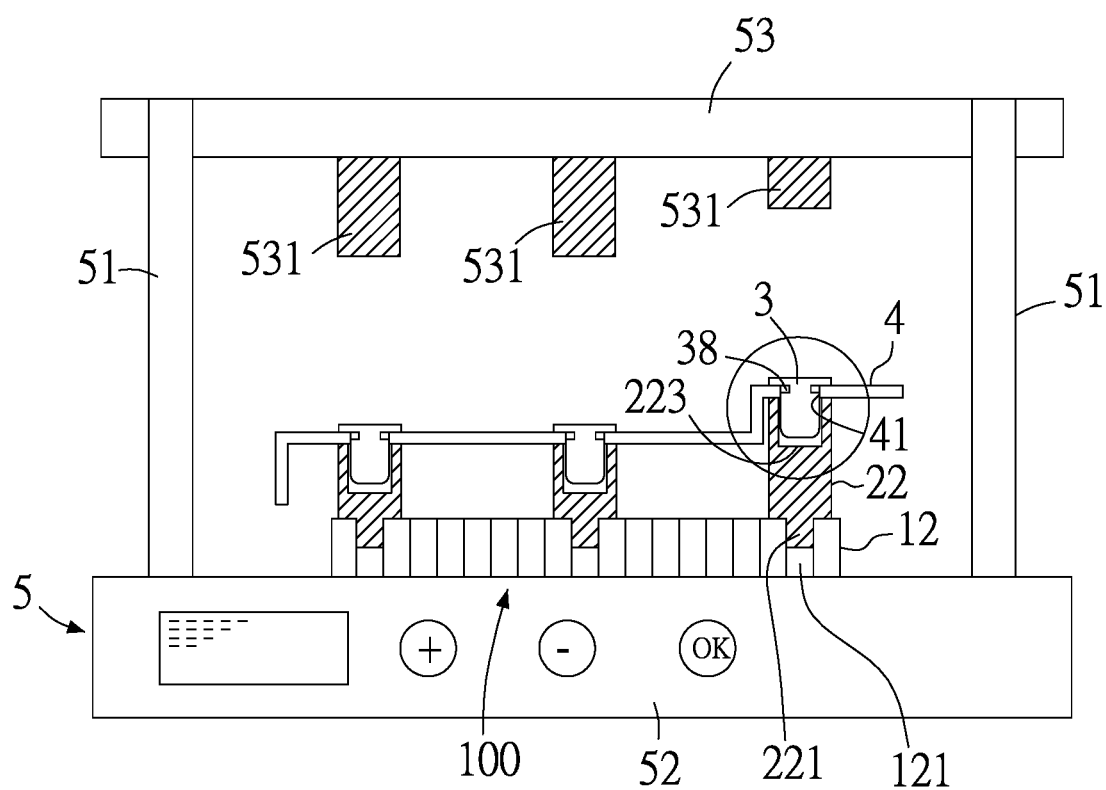
FIG. 13 is a simplified sectional side view of a third embodiment of the assembling apparatus that uses the second main die and the second matching dies according to the present disclosure to manufacture an object.

Please refer to FIG. 13, in which a third embodiment of the assembling apparatus 5 provided according to the present disclosure is shown. The assembling apparatus 5 of FIG. 13 is different from that of FIG. 9 in that, in FIG. 13, the third embodiment of the assembling apparatus 5 does not include the first main die 11 and the first matching dies 21. In stead, the third embodiment includes a pressure boosting section 53 supported on the downward pressing sections 51. The pressure boosting section 53 includes a plurality of pressure boosting units 531, such as pressure boosting columns, for pressing the elements 3 against the target member 4. The third embodiment of the assembling apparatus 5 can also achieve the purpose of quick and correct assembling the elements 3 to the target member 4 to form a desired object. Further, the third embodiment of FIG. 13 is also applicable to the assembling die block 100 that includes only the first main die 11 and the first matching dies 21 without the second main die 12 and the second matching dies 22. In this case, the pressure boosting section 53 and the pressure boosting units 531 thereof are changed in position to be provided on the operational base 52; and the first main die 11 and the first matching dies 21 are changed in position to be supported on the downward pressing sections 51; and there are also provided the elements 3 and the target member 4. When the downward pressing sections 51 move the first main die 11 and the first matching dies 21 downward, the pressure boosting units 531 (such as pressure boosting columns) of the pressure boosting section 53 press the elements 3 against the target member 4.

Figure 14:
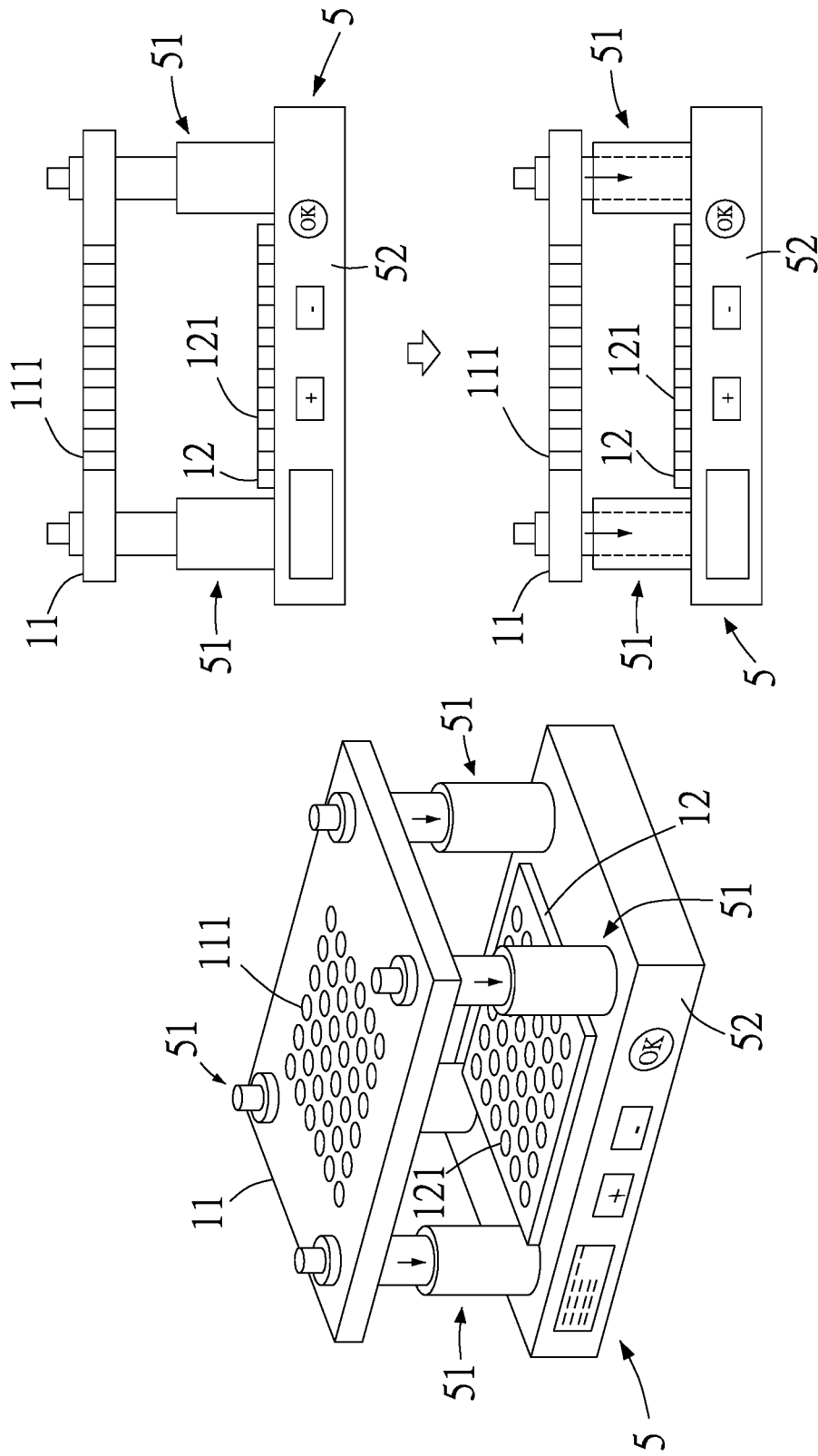
FIG. 14 is a simplified perspective view of a fourth embodiment of the assembling apparatus that uses the first and second main dies according to the present disclosure to manufacture an object.

Please refer to FIG. 14, in which a fourth embodiment of the assembling apparatus 5 is shown. In this embodiment, the downward pressing sections 51 are powered extendable stems, such as the extendable stems driven by air cylinders, hydraulic cylinders, or linear motors, so that the first main die 11 and the first matching dies 21 or the pressure boosting section 53 is movable upward and downward.

In summary, the assembling die block 100 and the assembling apparatus 5 provided according to the present disclosure can minimize the requirement for different devices and manufacturing processes to achieve the purpose of quick and correct association of the matching dies 21, 22 with the main dies 11, 12 to form the assembling die block 100.

While the present disclosure has been described by means of specific embodiments, numerous modifications and variations could be made thereto by those skilled in the art without departing from the scope and spirit of the present disclosure set forth in the claims.

What is claimed is:

1. An assembling die block, comprising:
   a second main die including at least one second mounting section; and
   at least one second matching die respectively including a second mating section to be correspondingly associated with the at least one second mounting section;
   wherein there are a plurality of second mounting sections arrayed in a matrix on the second main die; and
   wherein the second mounting sections are respectively assigned a piece of main code information, the at least one second matching die is respectively assigned a piece of matching code information, and the matching code information of the at least one second matching die and the main code information of the second mounting sections are in one-to-one correspondence.

2. An assembling apparatus, comprising:
   an operational base;
   a plurality of downward pressing sections supported on the operational base;
   a pressure boosting section including at least one pressure boosting unit, and the pressure boosting section being supported on the downward pressing sections; and
   an assembling die block, comprising:
     a second main die including at least one second mounting section; and
     at least one second matching die respectively including a second mating section to be correspondingly associated with the at least one second mounting section, the second main die of the assembling die block being supported on the operational base, and the at least one pressure boosting unit and the at least one second matching die of the assembling die block being located opposite to one another;
     wherein there are a plurality of second mounting sections arrayed in a matrix on the second main die.

3. An assembling die block, comprising:
   a second main die including at least one second mounting section; and
   at least one second matching die respectively including a second mating section to be correspondingly associated with the at least one second mounting sections; and
   wherein the at least one second mounting section is respectively assigned a piece of main code information, the at least one second matching die is respectively assigned a piece of matching code information, and the matching code information of the at least one second matching die and the main code information of the at least one second mounting section are in one-to-one correspondence.

4. The assembling die block according to claim 3, wherein there is a plurality of second mounting sections arrayed in a matrix on the second main die.

5. An assembling apparatus, comprising:
   an operational base;
   a plurality of downward pressing sections supported on the operational base;
   a pressure boosting section including at least one pressure boosting unit, and the pressure boosting section being supported on the downward pressing sections; and
   an assembling die block according to claim 3; the second main die of the assembling die block being supported on the operational base, and the at least one pressure boosting unit and the at least one second matching die of the assembling die block being located opposite to one another.

\* \* \* \* \*